United States Patent Office
3,775,455
Patented Nov. 27, 1973

3,775,455
SOLID, WATER-SOLUBLE TRANS-ACID COMPLEXES WITH CHROMIUM (III) NITRATE
Charles Carmen Cumbo, Wilmington, Del., assignor to E. I. du Pont de Nemours and Company, Wilmington, Del.
No Drawing. Filed Dec. 27, 1971, Ser. No. 212,759
Int. Cl. C07f 11/00; B32b 17/06
U.S. Cl. 260—438.5 R
10 Claims

ABSTRACT OF THE DISCLOSURE

Solid, water-soluble complexes of certain trans-acids with chromium (III) nitrate are prepared by dispersing solutions of these complexes in tetrahydrofuran or an alcohol having 2–4 carbon atoms in a diluent liquid selected from chlorinated, aliphatic hydrocarbons having 1–4 carbon atoms, aromatic hydrocarbons having 6–8 carbon atoms, and ethers having 4–8 carbon atoms. The solid complexes obtained by this process are excellent coupling agents for thermoplastic resin composites containing glass fibers.

BACKGROUND OF THE INVENTION

This invention relates to solid, water-soluble complexes of certain trans-acids with chromium (III) nitrate, which are excellent coupling agents for thermoplastic resin composites.

Certain complexes including fumaratochromium (III) nitrates, are disclosed in the copending application of Alden J. Deyrup, Ser. No. 25,097, filed Apr. 2, 1970, and assigned to the assignee of the present invention. The Deyrup process for making complexes of chromium (III) nitrate with fumaric acid yields relatively dilute solutions in which the concentrations of chromium generally are within the range of 0.05 to 0.5 gram-atom of chromium per liter. Storage stability of such solutions depends on their concentration, their pH and to some extent on their temperature. Reversion to fumaric acid and hexaaquochromium (III) nitrate can occur in the presence of by-product nitric acid at low pH. At high concentrations and temperatures, additional polymerization will occur, resulting in an insoluble product.

Solid, water-soluble complexes of chromium (III) nitrate with fumaric acid have not heretofore been described. Such complexes would offer a considerable advantage over the prior art solutions because they would be considerably more practical to store and less expensive to ship. Furthermore, they could be expected to be more stable than the soltuions.

SUMMARY OF THE INVENTION

According to this invention, there is now provided a solid, water-soluble complex of chromium (III) nitrate with a trans-acid having the following formula:

(1)
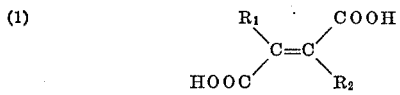

wherein $R_1$ and $R_2$ are each independently hydrogen, alkyl, phenyl, or the —$CH_2COOH$ group; provided that the maximum number of carbon atoms in the trans-acid is 10.

For the purpose of this invention, a trans-acid has two carboxylic groups adjacent to a double bond, the carboxylic groups being in the trans-configuration to each other.

The above complex must have 0.1 to 0.7 mole of the trans-acid per gram-atom of chromium and about 1–2 nitrate ions per chromium atom. Complexes containing less than about one nitrate ion per chromium atom have low solubility in water and are less desirable. This solid complex is obtained by intimately dispersing an alcoholic solution of the complex and a chlorinated hydrocarbon or an aromatic hydrocarbon in each other.

DETAILED DESCRIPTION OF THE INVENTION

It is critical for sufficient water-solubility of the solid complexes of this invention that the ratio of the trans-acid to chromium be less than 0.7 mole per gram-atom. Below 0.1 mole trans-acid per gram-atom of chromium, the complexes will be less effective as coupling agents for glass fiber-polyolefin composites. For the optimum combination of coupling effectiveness and water solubility this proportion should be within the range of 0.4–0.6 mole per gram-atom.

While water-soluble complexes have 1–2 nitrate ions per chromium atom, complexes having 1.1–1.7 nitrate ions per chromium atom are preferred. These preferred complexes are free-flowing, granular powders. They are readily soluble in water and are highly effective coupling agents for glass fiber-polyolefin composites.

A water-soluble complex is defined for the purpose of this invention as one that can form a solution in water containing at least 1% by weight of chromium at room temperature. This does not mean, however that each complex will readily dissolve at room temperature. In practice, it is preferred to heat a slurry of a complex in water for a few minutes at at least 50° C. to facilitate the dissolution. The complex will remain in solution, even after cooling to room temperature. The preferred products of this invention are water-soluble to the extent of at least 5% by weight of chromium.

The apparent difficulty in dissolving these complexes in water at room temperature is due to the fact that the dry product contains significantly less than the theoretical amount of hydration water. Once the material has been fully hydrated at a higher temperature, its water-solubility is considerably increased, and it remains in solution. It has found that the dissolution of certain less soluble complexes is easier in the presence of small amounts of nitric acid. In practice, enough nitric acid is added to lower the pH below about 1. The dissolved complex then remains in the solution. The water-solubility of these complexes, as defined above, includes solubility in the presence of nitric acid.

Although the exact chemical structure of the compounds of the present invention are not known with certainty, it is believed that at least some chromium atoms are linked together by the trans-acid, as illustrated by the following Formulas 2 and 3.

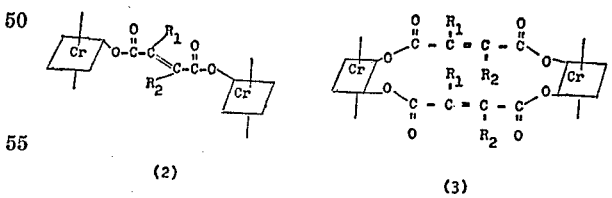

(2)        (3)

Some chromium atoms are linked together by "ol" bonds, as shown, for example, in Formulas 4 and 5; such chromium atoms are said to be olated.

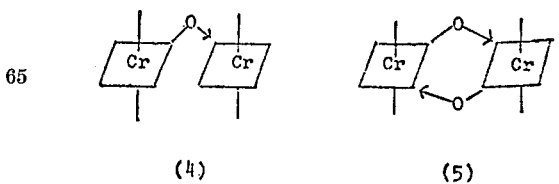

(4)        (5)

The complexes of this invention form colored solutions in water, which have absorption maxima (λ) and molar extinction coefficients (ε) within the following ranges:

$\lambda(m\mu)$:                          ε(liters/mole·cm.)
$\lambda_1$ 410–415 ---------------------------- $\varepsilon_1$ 25–35
$\lambda_2$ 570–575 ---------------------------- $\varepsilon_2$ 25–35

The process of this invention comprises the following four steps: (a) formation of olated chromium (III) nitrate in tetrahydrofuran or an alcohol having 2–4 carbon atoms, (b) reaction of olated chromium (III) nitrate with an appropriate trans-acid to form the corresponding complex, (c) precipitation of the solid product by dispersion in a chlorinated hydrocarbon or aromatic hydrocarbon, and (d) recovery of the solid product.

The first step, the preparation of olated chromium (III) nitrate, can start with either chromium (III) nitrate nonahydrate (the usual commercial form) or with chromium trioxide, $CrO_3$. In the first case, the chromium nitrate is dissolved in tetrahydrofuran or in an alcohol having 2–4 carbon atoms and held for at least one hour at room temperature or heated at least 10 minutes above 50° C. Preferred alcohols are isopropyl alcohol and tert-butyl alcohol. In the second case, a concentrated solution of $CrO_3$ in water (about 28 weight percent $CrO_3$) is slowly added to isopropyl alcohol containing 2–3 moles of nitric acid per mole of $CrO_3$ at 0–50° C., preferably below 35° C. After all chromium trioxide has been added, the solution is allowed to stand for at least one hour at room temperature or is heated for a few minutes above 50° C.

In either case, the amount of water in the solution must be carefully controlled since amounts of water exceeding about 10 weight percent of the total solvent slow the olation rate below practical limits. Since the commercial chromium (III) nitrate contains a large amount of hydration water, solutions containing more than about 3 weight percent of chromium cannot be prepared in a simple, direct manner. The same is true of the process starting with chromium trioxide. A solution of chromium trioxide in water must be used because dry chromium trioxide could react violently with the alcohol which serves as the reducing agent. Here again, a final solution containing about 3 weight percent of chromium appears to be economically the most advantageous.

In the second step, the appropriate trans-acid is added to the solution in the desired proportion. The complex formation usually requires 1–4 hours at room temperature for substantial completion, but it can be accelerated by heating. Within the temperature range of 50° C. to boiling, the reaction normally will be complete in 10–30 minutes. It is believed that the carboxylic acid-chromium bonds are formed, at least in part, by rupture of the "ol" bonds, as shown below:

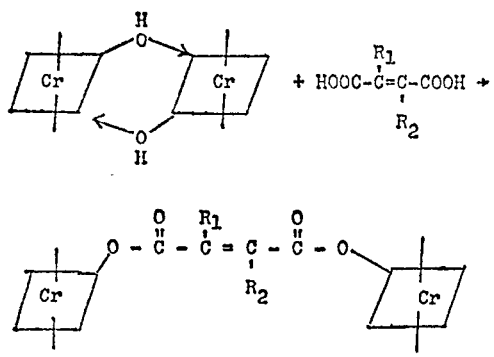

However, the details of this mechanism are not well defined and other mechanisms may also contribute to the overall result. Whether or not olated chromium (III) nitrate is formed in the first step or the "ol" bonds break in the second step is immaterial from the standpoint of the operative features of the process. Experience has shown that the present process is the most suitable for the preparation of solid, water-soluble chromium (III) nitrate complexes with trans-acids.

In the third step, the solution of the complex and a diluent liquid are intimately dispersed in each other. The diluent liquid can be a chlorinated, aliphatic hydrocarbon having 1–4 carbon atoms, an aromatic hydrocarbon having 6–8 carbon atoms, or a straight-chain, aliphatic ether having 4–8 carbon atoms. Compatible mixtures of two or more such liquids can also be used. A compatible mixture for the purpose of this disclosure is a homogeneous mixture or solution in each other of two or more such liquids. Only one liquid phase thus is present. This is the critical step of the present process.

Typical diluent liquids include methylene chloride, chloroform, carbon tetrachloride, perchloroethylene, trichloroethylene, dichloropropane, dichlorobutane, benzene, toluene, xylene, diethyl ether, dipropyl ether, diethylene glycol diethyl ether, and dioxane. Carbon tetrachloride, methylene chloride, chloroform, benzene, and toluene are preferred because they usually give a granular, free-flowing product in high yield and are less expensive than other suitable diluents. Ethers are useful mainly when the ratio of the trans-acid to chromium is below 0.3 mole per gram-atom. At higher ratios of the trans-acid, the products obtained from ethers tend to be very difficult to dissolve in water.

The volume of the diluent liquid must be considerably larger than the volume of the chromium complex solution. The practical volume ratio is between about 5 and 10, a ratio of about 8 being preferred because it gives the highest yields and the most free-flowing solid. No improvement in yield or quality of the product is observed above the ratio of 10 volumes of the diluent liquid per volume of the chromium complex solution.

The order of addition is not critical. The dispersion of the complex solution and the diluent liquid in each other is accomplished by effective agitation, e.g., stirring. Agitation usually is maintained for at least a few minutes after the addition. Precipitation is complete within about five minutes after the addition. This precipitation step can be carried out at any convenient temperature, the range of about 0°–50° C. being satisfactory. There is no advantage in working below the room temperature, and the temperature range of about 25–50° C. is preferred because it avoids the expense and inconvenience of refrigeration.

In the final step of the process, the product is isolated from the slurry by any convenient technique, including filtration, decantation, or centrifugation. The product is dried, preferably at a temperature not exceeding 50° C.

The solid, water-soluble product of this invention can also be prepared by the process of the concurrently filed commonly assigned, copending application Ser. No. 212,758 of H. B. West, in which an aqueous solution of the complex is added to acetone, causing the product to separate as a solid.

The invention is now illustrated by examples of certain preferred embodiments thereof, wherein all parts, proportions, or percentages are by weight unless indicated otherwise.

Example 1

Chromium (III) nitrate nonahydrate at a concentration of 0.2 M in isopropyl alcohol was allowed to stand for four hours at room temperature. This resulted in the formation of olated chromium (III) nitrate. To 100 cc. of the solution was added, with stirring, 1.16 grams (0.01 mole) of fumaric acid. The reaction was allowed to continue for three additional hours at room temperature. The solution was then poured into 900 cc. of carbon tetrachloride. A blue solid precipitated from the reaction mixture and was recovered by filtration. The product was washed with 200 cc. carbon tetrachloride and air dried at 25° C. Over 99% of the chromium was recovered in the precipitated product. The sample was analyzed for $NO_3^-$ with a Beckmann ion selective electrode. Chromium was determined by conversion to $CrO_4^=$ with alkaline hydrogen peroxide and measuring the absorption of the solution at 372 m$\mu$ using $\epsilon = 4.78 \times 10^3$. The product was found to contain 14.5% chromium, 6.7% carbon, and 27.4% nitrate anion. This corresponds to a 1.58:1 ratio of nitrate ion to chromium and a 0.5:1 ratio of fumaric acid to chromium.

A sample of 34.5 g. of the solid product was stirred into sufficient water to give a total volume of 100 ml. The mixture was heated to 70° C., where all the solids went into solution. The solution was cooled to room temperature and no precipitate formed. This solution contained 50 g. Cr (III)/liter of solution. This aqueous solution, when diluted to 0.0205 molar chromium (III) with water, gave a light absorption spectrum with the following absorption maxima and molar extinction coefficients.

| $\lambda$(m$\mu$): | $\epsilon$(liters/mole·cm.) |
|---|---|
| 411.7 | 32.6 |
| 573.8 | 33.6 |

The above fumaratochromium nitrate complex was then used as a coupling agent for the fabrication of two polyethylene-E-glass fiber fabric laminates. The woven E-glass fabric was a commercial grade Style 181, heat cleaned, Finish 112, available from J. P. Stevens & Co., Inc., 1460 Broadway, New York, N.Y. 10018. The polyethylene was a resin in the form of pellets commercially available as Alathon® 7050 grade from E. I. du Pont de Nemours and Company.

6.9 grams of the complex were added to 993 g. of water to give a dilute coupling agent solution having a chromium concentration of 0.1%. The pH of this solution was adjusted upward from 2.5 to 3.0 by the addition of 4 ml. of a one molar sodium bicarbonate solution.

Four 38″ long, 6″ wide strips of glass fabric were cut from a roll in the fill direction and soaked in the coupling agent solution for about 5 minutes. The strips were next passed through a wringer with roller tension adjusted to give a wet pickup of approximately 50%. The strips were then dried in a circulating-air oven for 10 min. at 125° C. and cut into 6″ x 6″ panels. The 24 resulting panels were frayed approximately ¼″ on each edge, by removing threads parallel to the edge.

The polyethylene pellets were mixed with an equal weight of Dry Ice and milled through a Wiley mill, then dried in an air oven at 100° C. for four hours. A fine, dry polyethylene powder was thus obtained.

Each of the two laminates was then made and tested as follows:

Thirty-nine grams of the polyethylene (PE) powder were divided into thirteen 3 g. fractions. The first 3 g. fraction was spread evenly at the bottom of the cavity of a 6″ x 6″ steel mold. A 6″ x 6″ treated glass panel was placed flat on top of the PE powder layer, and a second 3 g. fraction of PE powder was in turn spread evenly on top of the glass panel. The operation was repeated until a PE-glass sandwich made up of twelve layers of glass panels alternating with layers of PE powder was assembled inside the steel mold. The last 3 g. fraction of PE powder was then spread evenly on the top glass panel.

The steel mold thus loaded was placed in a heated press and firm pressure, enough to hold the multilayer sandwich in position, was applied. The press was then heated to 175° C., and 830 p.s.i. pressure was applied. The material was held at 830 p.s.i. and 175° C. for 2 minutes. At the end of this period, the press was allowed to cool to room temperature. The pressure was then released and the mold was unloaded.

A 6″ x 6″ x ⅛″ dense, rigid, light green, translucent laminate was obtained in this manner.

The laminate was clamped onto the reciprocating table of a precision type hydraulic feed, horizontal spindle, surface grinder and sliced into test bars, 6″ x ½″ x ⅛″ using a 5″ diameter resin-bonded diamond cutting wheel. The flexural strength was measured using a modified form of Federal Specification L-P-406b, Method 1031, Sept. 27, 1951. Five bars were tested as cut from the laminate, and four bars were tested after being submerged in boiling water for two hours. The average values obtained are referred to as "dry" and "wet" flexural strength (modulus of rupture), respectively. The two laminates had average dry strengths of 46,500 and 46,000, and average wet strengths of 46,000 and 44,800 p.s.i., respectively. This compares to dry and wet strengths of 15,000 and 8,000 p.s.i., respectively, for a laminate made without the use of a coupling agent.

Example 2

The process of Example 1 is repeated, using 900 ml. of chloroform instead of 900 ml. of carbon tetrachloride. The product has the same light absorption spectrum, $NO_3/Cr$ ratio, and fumaric acid/chromium ratio as in Example 1.

Example 3

The process of Example 1 is repeated, substituting toluene for carbon tetrachloride and t-butyl alcohol for isopropyl alcohol. The product has the same light absorption spectrum, $NO_3/Cr$ ratio and fumaric acid/chromium ratio as in Example 1.

Example 4

The process of Example 1 is repeated, using 0.46 g. (0.004 mole) of fumaric acid and using 900 ml. of diethyl ether instead of 900 ml. of carbon tetrachloride. The recovered product has an $NO_3/Cr$ ratio of 1.2 and a fumaric acid to chromium ratio of 0.2.

Example 5

The process of Example 1 is repeated, using 1.62 g. (0.014 mole) of fumaric acid. The resulting product has an $NO_3/Cr$ ratio of 1.3 and a fumaric acid to chromium ratio of 0.7.

I claim:

1. A solid, water-soluble complex of chromium (III) nitrate with a trans-acid having the formula

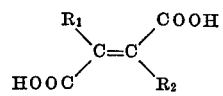

wherein
$R_1$ and $R_2$ are each independently hydrogen, alkyl, phenyl, or the —$CH_2COOH$ group;
provided that the maximum number of carbon atoms in the trans-acid is 10; the ratio of the trans-acid to chromium is 0.1–0.7 mole per gram-atom; there are about 1–2 nitrate ions per chromium atom and aqueous solutions of said complex give a light absorption spectrum having maxima at about 410–415m$\mu$ and 570–575m$\mu$.

2. A complex of claim 1 wherein the trans-acid is fumaric acid.

3. A complex of claim 1 wherein the ratio of the trans-acid to chromium is 0.4–0.6 mole per gram-atom; and there are 1.1–1.7 nitrate ions per chromium atom.

4. A complex of claim 3 wehrein the trans-acid is fumaric acid.

5. A process for the preparation of a solid, water-soluble complex of chromium (III) nitrate with a trans-acid having the formula

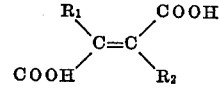

wherein
$R_1$ and $R_2$ are each independently hydrogen, alkyl, phenyl, or the —$CH_2COOH$ group;

provided that the maximum number of carbon atoms in the trans-acid is 10; the ratio of the trans-acid to chromium is 0.1–0.7 mole per gram-atom; and there are about 1–2 nitrate ions per chromium atom, said process comprising the steps of intimately dispersing in each other a solution of the complex in tetrahydrofuran or an alcohol having 2–4 carbon atoms, said solution containing up to 10 weight percent of water, and a diluent liquid selected from the group consisting of chlorinated, aliphatic hydrocarbons having 1–4 carbon atoms, aromatic hydrocarbons having 6–8 carbon atoms, straight-chain aliphatic ethers having 4–8 carbon atoms, and compatible mixtures thereof; and separating the resulting solid material from the liquid;

provided the volume ratio of the diluent liquid to the solution of the trans-acid complex with chromium (III) nitrate is 5–10, and the temperature of the dispersing step is 0–50° C.

6. The process of claim 5 wherein the trans-acid is fumaric acid.

7. The process of claim 5 wherein the diluent liquid is selected from methylene chloride, chloroform, carbon tetrachloride, perchloroethylene, trichloroethylene, dichloropropane, dichlorobutane, benzene, toluene, xylene, diethyl ethers, dipropyl ether, diethylene glycol diethyl ether, and dioxane.

8. The process of claim 5 wherein the ratio of the trans-acid to chromium is 0.4–0.6 mole per gram-atom, and there are 1.5–1.7 nitrate ions per chromium atom.

9. The process of claim 8 wherein the trans-acid is fumaric acid.

10. The process of claim 9 wherein the solvent for the complex is isopropyl alcohol or tert-butyl alcohol, and the diluent liquid is carbon tetrachloride, methylene chloride, chloroform, benzene, or toluene.

References Cited

UNITED STATES PATENTS

| | | | |
|---|---|---|---|
| 2,524,803 | 10/1950 | Iller | 260—438.5 C |
| 2,544,666 | 3/1951 | Goebel | 260—438.5 C |
| 2,918,483 | 12/1959 | Varul | 260—438.5 R |
| 3,137,717 | 6/1964 | Peters | 260—438.5 R |

OTHER REFERENCES

Chemical Abstracts, vol. 64, 15351e (1966).
Chemical Abstracts, vol. 42, 5367d (1948).
Chemical Abstracts, vol. 48, 9856a (1954).

DANIEL E. WYMAN, Primary Examiner

A. P. DEMERS, Assistant Examiner

U.S. Cl. X.R.

161—192, 203, 247; 260—438.5 C